(No Model.) 2 Sheets—Sheet 1.
R. H. EDWARDS.
REVERSING GEAR FOR CLUTCH COUPLINGS.
No. 445,772. Patented Feb. 3, 1891.
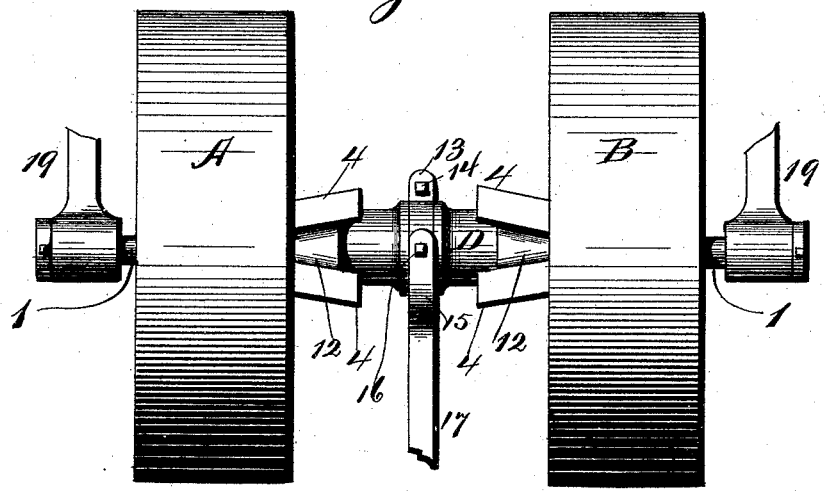
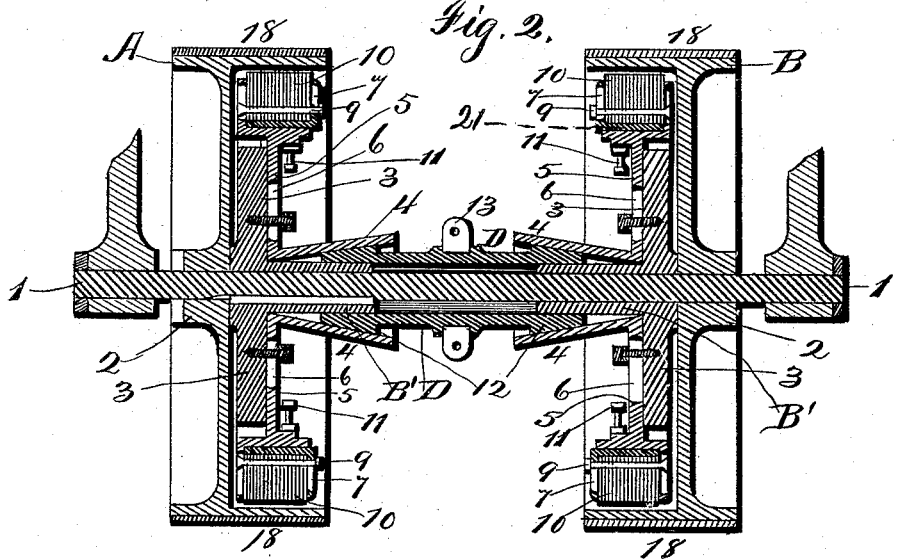
WITNESSES:
H. P. Denison
C. D. Cowles
Walter Allen
Robert H. Edwards INVENTOR
BY
Smith & Denison
his ATTORNEY (No Model.) 2 Sheets—Sheet 2.
R. H. EDWARDS.
REVERSING GEAR FOR CLUTCH COUPLINGS.
No. 445,772. Patented Feb. 3, 1891.
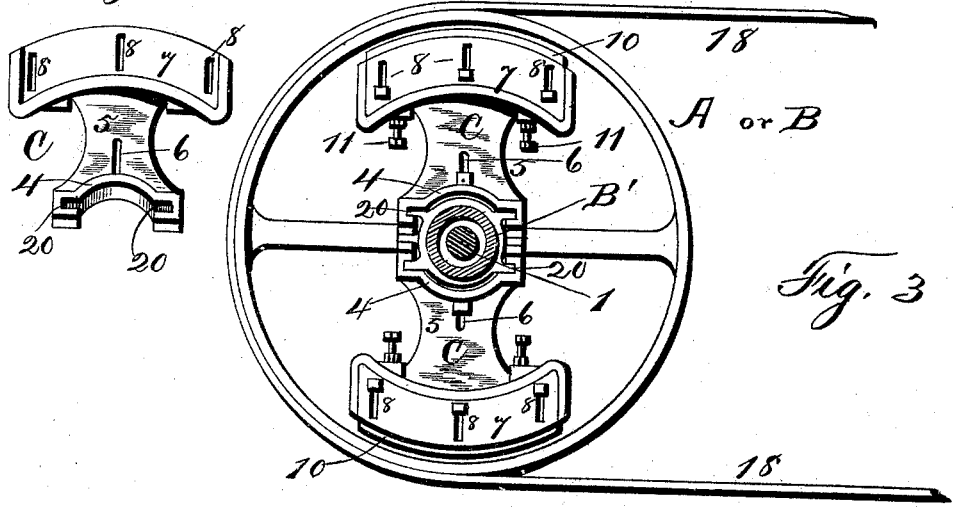
*Fig. 5.*
*Fig. 3.*
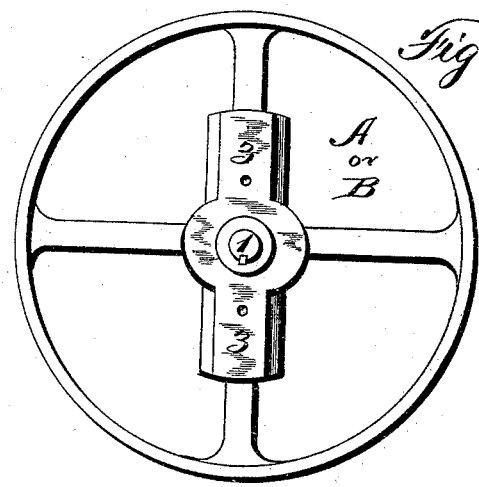
*Fig. 4.*
WITNESSES:
H. P. Denison
C. D. Cowles
Walter Allen
Robert H. Edwards INVENTOR
BY
Smith & Denison
his ATTORNEYS

UNITED STATES PATENT OFFICE.

ROBERT HAMMOND EDWARDS, OF WELLSBOROUGH, PENNSYLVANIA.

REVERSING-GEAR FOR CLUTCH-COUPLINGS.

SPECIFICATION forming part of Letters Patent No. 445,772, dated February 3, 1891.

Application filed May 9, 1890. Serial No. 351,109. (No model.)

*To all whom it may concern:*

Be it known that I, ROBERT HAMMOND EDWARDS, of Wellsborough, in the county of Tioga, in the State of Pennsylvania, have invented new and useful Improvements in Reversing-Gears for Clutch-Couplings, of which the following, taken in connection with the accompanying drawings, is a full, clear, and exact description.

My invention relates to friction devices for controlling the rotation of a driving or feed pulley for whatever purpose the pulley is used, whether for a reversing-gear, for friction-feed, for saw-carriages, log-turners, jackways, friction-clutches, coupling elevators, tight and loose pulleys for driving-shafts, hoisting-machines, dredges, pile-drivers, or any other analogous use.

My object is to produce an improved friction grip or clutch used in conjunction with a drive-pulley for any of the uses above mentioned.

My invention consists in the several novel features of construction and operation hereinafter described, and specifically set forth in the claims hereunto annexed.

It is constructed as follows, reference being had to the accompanying drawings, in which—

Figure 1 is a front elevation of two pulleys upon a single shaft provided with my friction-clutch mechanism. Fig. 2 is a longitudinal vertical section of the same. Fig. 3 is an elevation of the inner face of one of the pulleys. Fig. 4 is a like view of the outer face. Fig. 5 is an isometrical view of the friction-holder detached.

A and B are driving-pulleys mounted loosely upon the shaft 1, and, as shown in the drawings, each is provided with a hub 2 on the outer side only.

B' is a tubular sleeve keyed onto the shaft 1 and provided with radial arms or wings 3.

C is my friction-holder, comprising a frustro-conical body 4, a radial arm 5, provided with a slot 6, cut on a radial line, and upon its upper end with a box 7, open on its outer end and provided with slotways 8, which receive the bolts 9, which pass through and hold the friction material 10 in the box, and said box is also provided with set-screws 11 through its bottom, which bear against a base 21, upon which the friction material rests, and regulate its outward projection beyond the outer end of the box, so that the wear thereof can be taken up. This friction material consists of sheets of paper or paper-board, wood, leather, cork, or analogous material.

D is a sleeve normally fitting loosely over the inner ends of the sleeve B and provided with frusto-conical or tapering heads 12, which lie in the tapering cavity between the body 4 and the sleeve B. This sleeve D is also provided with a central groove receiving a split ring or box 13, adjustable as to its tightness therein by a screw 14 through its ends, and 15 is a yoke curved to partially embrace the ring, and pivotally connected thereto by the set-screws 16, and 17 is an operating lever or handle connected to the yoke, so that when the lever is thrown over it forces one of the heads 12 against and into the conical body 4, wedging it outward until the friction material is brought into contact with the inner periphery of the rim of that pulley, and as soon as sufficient frictional contact is attained the belt 18 will rotate the pulley, the friction-holders, the sleeve B, and the shaft so long as sufficient frictional contact is maintained, and then when the pressure upon the lever is reduced the frictional contact is also reduced until the grip is partially or entirely lost, thus producing a positive or varying feed or grip. When the grip is entirely released, the pulley alone is rotated by the belt.

The shaft is carried by hangers 19 on boxes of any ordinary construction.

I show the friction-holder C in two parts and the body 4 as provided with side internal grooves 20, which operate as guides for the heads 12 and to more thoroughly lock the heads and the body together.

What I claim as my invention, and desire to secure by Letters Patent, is—

1. The combination, with the pulley and its hub mounted loosely upon a shaft, of a sectional sleeve fitting over and flaring outwardly from the shaft and provided with slotted radial arms, guide-pins on the spokes of the pulley, boxes on the outer ends of the arms slotted to receive bolts, friction material inserted into the open ends of the boxes, retaining-bolts through the slots and frictional material, adjusting-bolts through the bases of the boxes and bearing against the friction material, another sleeve mounted upon the shaft, a slide upon the latter sleeve provided with tapering ends, and means for moving the slide on the sleeve to force one of the tapered ends into the flaring sectional sleeve.

2. The combination, with the pulley and its hub mounted loosely upon a shaft, of a sectional sleeve fitting over and flaring outwardly from the hub and having grooves 20 in the flaring ends, radial arms upon the sleeve-sections for receiving guide-pins, boxes on the outer ends of the arms and slotted to receive bolts, friction material inserted into the open ends of the boxes, retaining-bolts through the slots and friction material, adjusting-bolts through the bases of the boxes and bearing against the friction material, another sleeve on the shaft, a slide upon the sleeve provided with tapered ends adapted to interlock with the grooves in the sleeve-sections, and means to move the slide upon the sleeve.

In witness whereof I have hereunto set my hand this 12th day of April, 1890.

ROBERT HAMMOND EDWARDS.

In presence of—
  J. E. LAY,
  JOSEPH WILLIAMS.